US008104070B2

(12) United States Patent
Douceur et al.

(10) Patent No.: US 8,104,070 B2
(45) Date of Patent: Jan. 24, 2012

(54) INTEREST ALIGNED MANUAL IMAGE CATEGORIZATION FOR HUMAN INTERACTIVE PROOFS

(75) Inventors: John R. Douceur, Bellevue, WA (US); Jeremy Eric Elson, Kirkland, WA (US); Jonathan Ryan Howell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 11/856,371

(22) Filed: Sep. 17, 2007

(65) Prior Publication Data

US 2009/0077629 A1 Mar. 19, 2009

(51) Int. Cl.
*G06F 7/04* (2006.01)
(52) U.S. Cl. .......................................................... 726/2
(58) Field of Classification Search ....................... 726/2
See application file for complete search history.

(56) References Cited

U.S. PATENT DOCUMENTS

| 6,195,698 | B1 * | 2/2001 | Lillibridge et al. ............ 709/225 |
| 7,200,576 | B2 | 4/2007 | Steeves et al. |
| 7,450,591 | B2 | 11/2008 | Korling et al. |
| 7,606,918 | B2 | 10/2009 | Holzman et al. |
| 7,680,891 | B1 * | 3/2010 | Pongsajapan .................. 709/206 |
| 7,760,641 | B2 | 7/2010 | Gilfix |
| 7,891,005 | B1 | 2/2011 | Baluja et al. |
| 2002/0026478 | A1 | 2/2002 | Rodgers et al. |
| 2002/0108046 | A1 | 8/2002 | Armingaud |
| 2003/0191964 | A1 | 10/2003 | Satyavolu et al. |
| 2004/0199597 | A1 | 10/2004 | Libbey et al. |
| 2004/0254793 | A1 | 12/2004 | Herley et al. |
| 2005/0065802 | A1 | 3/2005 | Rui et al. |
| 2005/0066201 | A1 * | 3/2005 | Goodman et al. ............ 713/202 |
| 2005/0120201 | A1 | 6/2005 | Benaloh et al. |
| 2005/0144067 | A1 | 6/2005 | Farahat et al. |
| 2005/0246775 | A1 | 11/2005 | Chellapilla et al. |
| 2005/0289645 | A1 | 12/2005 | Hori |
| 2006/0095578 | A1 | 5/2006 | Paya et al. |
| 2006/0250962 | A1 | 11/2006 | Chikamatsu |
| 2006/0274779 | A1 | 12/2006 | Shoham |
| 2007/0019543 | A1 | 1/2007 | Wei et al. |
| 2007/0026372 | A1 | 2/2007 | Huelsbergen |
| 2007/0101010 | A1 | 5/2007 | Ellison et al. |
| 2007/0143624 | A1 | 6/2007 | Steeves |
| 2007/0153697 | A1 | 7/2007 | Kwan et al. |

(Continued)

OTHER PUBLICATIONS

Luis von Ahn, et al. How lazy cryptographers do AI. Feb. 2004. http://www.captcha.net/captcha_cacm.pdf.

(Continued)

*Primary Examiner* — Kambiz Zand
*Assistant Examiner* — Teshome Hailu
(74) *Attorney, Agent, or Firm* — Zete Law, P.L.L.C.; MacLane C. Key

(57) ABSTRACT

A system and method that facilitates and effectuates distinguishing a human from a non-human user. A human interactive proof (HIP) employs images from a large private database of manually categorized images to display as part of a Turing test challenge. The private database contains a sufficient quantity of images, such that the more economical manner to pass the HIP is to employ a human to take the challenge. The owner of the private database makes the database available to the presenter of the HIP due to an alignment of interests between both parties. The HIP is displayed with ads on behalf of the owner of the private database and the presenter of the HIP gains access to a large quantity of private manually categorized images.

20 Claims, 10 Drawing Sheets

U.S. PATENT DOCUMENTS

| | | | |
|---|---|---|---|
| 2008/0063276 A1 | 3/2008 | Vincent et al. | |
| 2008/0133321 A1* | 6/2008 | Pennock et al. | 705/10 |
| 2009/0076965 A1* | 3/2009 | Elson et al. | 705/55 |

OTHER PUBLICATIONS

Monica Chew, et al. BaffleText: a Human Interactive Proof. Jul. 5, 2007. http://www.gbtn.org/~chlee/research/phishing/baffle_text.pdf.

Pablo Ximenes, et al. A Proposal of Human Interactive Proof in the Text Domain. Jul. 5, 2007. http://www.ppgia.pucpr.br/~maziero/pesquisa/ceseg/sbseg05/artigos/12714.pdf.

Yong Rui, et al. Excuse Me, But Are You Human? Nov. 2, 2003. http://delivery.acm.org/10.1145/960000/957113/p462-rui.pdf?key1=957113&key2=0812263811&coll=GUIDE&dl=GUIDE&CFID=23098507&CFTOKEN=47300983.

Kumar Chellapilla, et al. Using Machine Learning to Break Visual Human Interaction Proofs (HIPs). Jul. 5, 2007. http://research.microsoft.com/~kumarc/pubs/chellapilla_nips04.pdf.

Non-Final OA dated Jul. 21, 2010 for U.S. Appl. No. 11/856,362, 19 pages.

OA dated May 26, 2010 for U.S. Appl. No. 11/856,367, 39 pages.

OA dated Jul. 21, 2010 for U.S. Appl. No. 11/856,362, 19 pages.

Non-Final OA dated Dec. 27, 2010 for U.S. Appl. No. 11/856,367, 44 pages.

OA dated Jan. 5, 2011 for U.S. Appl. No. 11/856,362, 22 pages.

Final OA dated Jul. 20, 2011 for U.S. Appl. No. 11/856,362, 15 pages.

OA dated Apr. 29, 2011 for U.S. Appl. No. 11/856,362, 24 pages.

Non-Final OA dated May 27, 2011 for U.S. Appl. No. 11/856,367, 43 pages.

\* cited by examiner

INTEREST ALIGNED MANUAL IMAGE CATEGORIZATION FOR HUMAN INTERACTIVE PROOFS

BACKGROUND

There are many Internet or web based services that have a need to distinguish between a human and a computer user interacting with the service. For example, there are many free e-mails services that allow a user to create an e-mail account by merely entering some basic information. The user is then able to use the e-mail account to send and receive e-mails. This ease of establishing e-mail accounts has allowed spammers to produce computer programs to automatically create e-mail accounts with randomly generated account information and then employ the accounts to send out thousands of spam e-mails. Web services have increasingly employed Turing test challenges (commonly known as a Completely Automated Public Turing test to tell Computers and Humans Apart (CAPTCHA™) or Human Interactive Proof (HIP)) in order distinguish between a human and a computer as the user of the web service. The web service will only allow the user to employ the service after the user has passed the HIP.

The HIP is designed so that a computer program would have difficulty passing the test, but a human can more easily pass the test. All HIPs rely on some secret information that is known to the challenger but not to the user being challenged. HIPs or CAPTCHAs™ can be divided into two classes depending on the scope of this secret. In Class I CAPTCHAs™, the secret is merely a random number, which is fed into a publicly known algorithm to yield a challenge. Class II CAPTCHAs™ employ both a secret random input and a secret high-entropy database. A critical problem in building a Class II CAPTCHA™ is populating the database with a sufficiently large set of classified, high-entropy entries.

Class I CAPTCHAs™ have many virtues. They can be concisely described in a small amount of software code; they have no long term secret that requires guarding; and they can generate a practically unbounded set of unique challenges. On the other hand, their most common realization, a challenge to recognize distorted text, evinces a disturbingly narrow gap between human and nonhuman success rates. FIG. 2A shows an example of a simple class 1 CAPTCHA™ displaying a random text string. The figure shows clearly segmented characters. Optical character recognition algorithms are competitive with humans in recognizing distinct characters, which has led researchers toward increasing the difficulty of segmenting an image into distinct character regions. FIGS. 2B through 2E show common ways in which class I CAPTCHAs™ are modified in an attempt to make it more difficult for a computer program to correctly recognize the characters. However, this increase in difficulty affects humans as well. The owners of web services must be careful to not make the challenge so difficult that it drives away real human users from expending the effort to user their service. Even relatively simple challenges can drive away a substantial number of potential customers.

Class II CAPTCHAs™ have the potential to overcome the main weaknesses described above. Because they are not restricted to challenges that can be generated by a low-entropy algorithm, they can exercise a much broader range of human ability, such as recognizing features of photographic images captured from the physical world. Such challenges evince a broad gulf between human and non-human success rates, not only because general machine vision is a much harder problem than text recognition, but also because image-based challenges can be made less bothersome to humans without drastically degrading their efficacy at blocking automatons.

A significant issue in building a Class II CAPTCHA™ is populating the secret database. Existing approaches take one of two directions: (a) mining a public database or (b) providing entertainment as an incentive for manual image categorization. A problem with these approaches is that the public source of categorized images is small or available to attackers. Therefore, a small, fixed amount of manual effort spent reconstructing the private database can return the ability to solve an unbounded number of challenges. There is a need to make available to the CAPTCHA™ a private database that has a selection of accurately manually categorized images that is both substantially accurate and also sufficiently large enough to make it cost prohibitive for an entity attempting to automate a computer program for passing the challenge to reconstruct all or a significant portion of the categorized image database.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

In accordance with one or more aspects and corresponding disclosure thereof, various features are described in connection with a HIP for distinguishing a human from a nonhuman. In one aspect, a HIP service employs a large private database of manually categorized images as part of its Turing test challenge. The owner of the database is motivated to make their database available to the HIP service provider due to an alignment of interests. The HIP service provider presents images from the database as part of the challenge along with ads on behalf of the database owner. The HIP service can be a web based service or an installable application used to secure an internet, intranet, or non-networked computer application from use by an automated computer representing itself as a human. The private database can be securely network accessible by the HIP service or locally installable at the HIP service. The private database can also be dynamic such that it is being updated with new manually categorized images on a regular basis, such as hourly, daily, weekly or monthly. The database updates can be replicated to a locally installed database over a networked connection or via computer readable storage media. Some examples of computer programs that would employ the HIP service are, but are not limited to: a free e-mail service trying to prevent e-mail spammers from creating accounts, an event ticket seller limiting scalpers from buying large quantities of tickets, a web blog wanting to prevent automated postings from marketers or vandals, a domain name registrar preventing cyber squatters from buying large quantities of domain names that are variations of legitimate domain names; a free networked data storage site restricting account creation for storage of pirated copyrighted material; and a website trying to prevent a denial of service attack.

In another aspect, a HIP service employs a large private database of manually categorized images as part of its Turing test challenge. The owner of the database is motivated to make their database available to the HIP service provider due to an alignment of interests. The HIP service provider presents images from the database as part of the challenge along with ads on behalf of the database owner. The images and ads can be selected based upon attributes associated with a user attempting to pass the HIP and/or based upon attributes associated with a web service that is employing the HIP service in order to secure its web service from automated computer programs.

In yet another aspect, a HIP service employs a plurality of large private databases of manually categorized images as part of its Turing test challenge. The owners of the databases are motivated to make their databases available to the HIP service provider due to an alignment of interests. The HIP service provider presents images from the database as part of the challenge along with ads on behalf of the database owner. The database of images and ads can be selected based upon attributes associated with a user attempting to pass the HIP and/or based upon attributes associated with a web service that is employing the HIP service in order to secure its web service from automated computer programs.

Another aspect involves a HIP service employing a large private database of manually categorized images as part of its Turing test challenge. The owners of the databases are motivated to make their database available to the HIP service provider due to an alignment of interests. The HIP service provider presents images from the database as part of the challenge along with ads on behalf of the database owner. Once the HIP service has determined that the user attempting to pass the test is a human, any images that the user incorrectly identified can be tagged as possibly confusing. The HIP service can then employ statistics over a large population of users of the HIP service in order to identify images that are difficult for human users to accurately identify and prevent those images from being presented during a challenge.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
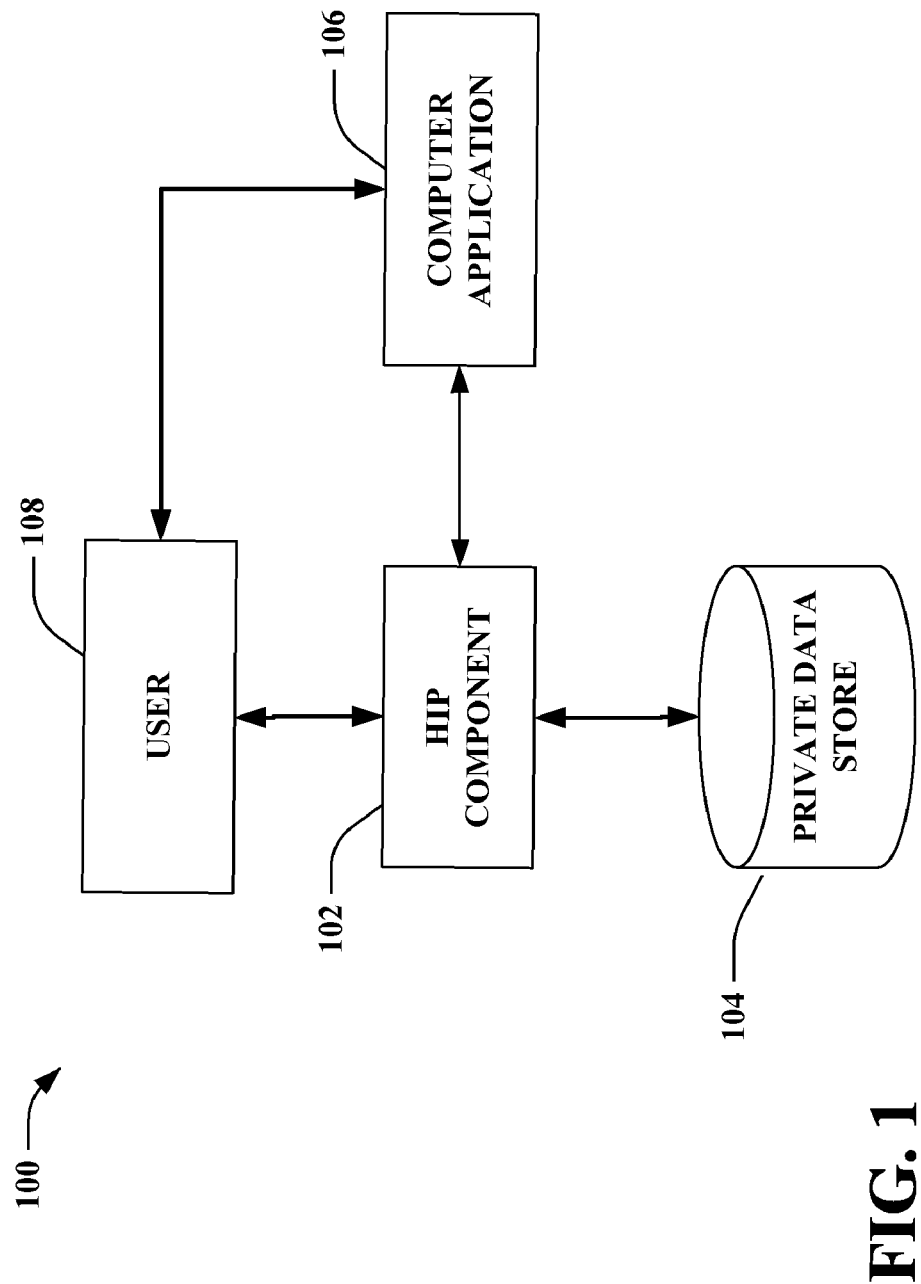
FIG. 1 illustrates a general block diagram HIP system employing a large private data store of substantially accurately manually categorized images.
Figure 2A:
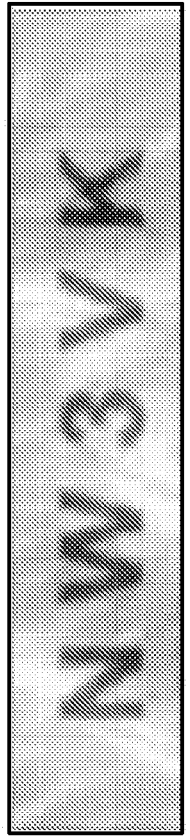
FIGS. 2A-2E illustrates examples of class 1 CAPTCHAs™ displaying a random text strings.
Figure 2B:
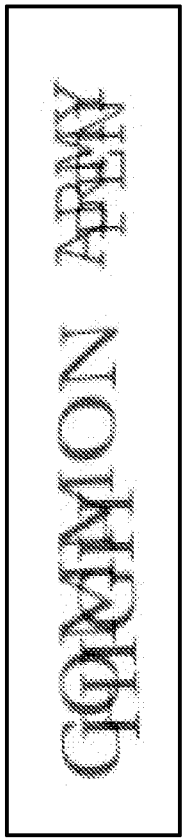
Figure 2C:
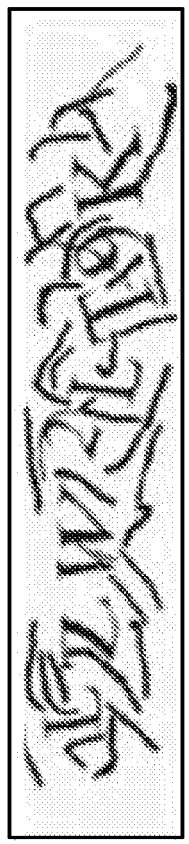
Figure 2D:
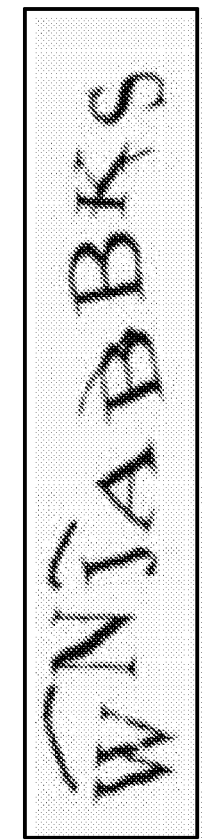
Figure 2E:
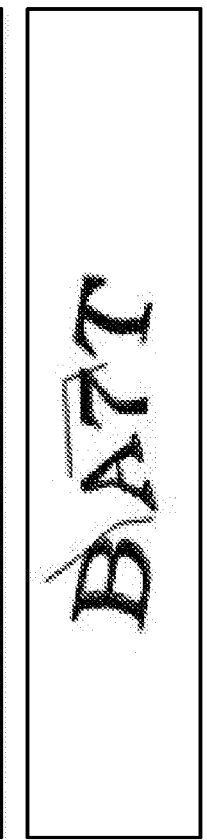

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

As used herein, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and/or thread of execution and a component can be localized on one computer and/or distributed between two or more computers.

Throughout the discussion below, experimental results based on exemplary training sets of data are presented to further support or illustrate various aspects of the subject application. It should be appreciated and understood that such experiments are not intended to limit the scope of the systems and methods described herein to particular scenarios, operating conditions or applications but are provided as examples. Moreover, the subject application can be employed with respect to any type of service performed on the Internet, on a remote or local server, storage facility, or on any computing device or network.

Referring to FIG. 1, there is illustrated a general block diagram HIP system 100 employing a large private data store of substantially accurately manually categorized images. System 100 includes a Human Interactive Proof (HIP) component 102 that distinguishes between a human and a non-human. HIP component 102 presents one or more challenges to user 108 to determine if user 108 is a human or a computer program. The challenges can include presenting one or more images to user 108 from private data store 104 that user 108 must correctly categorize before being allowed to partially or fully employ computer application 106. Private data store 104 can contain any manually categorized data item which the user will have to classify as part of the HIP—images are just one example. Other example data items are sound data items, such as songs or commonly heard sounds (car, airplane, train). For songs the user can be asked to identify the artist, genre, song title or any other attribute of the song. In a preferred embodiment, HIP component 102 is a web based service and computer application 106 is also a web based service. In the preferred embodiment, HIP component 102 and/or computer application 106 is owned by a party that is not the owner of the private data store 104. However, there is an alignment of interests between the owner of the private data store 104 and an owner of HIP component 102 and/or computer application 106. The owner of private data store 104 makes private data store 104 available for use by HIP component 102 in exchange for display of one or more ads on behalf of the owner of private data store 104 during HIP challenges. As used herein, the term "ad" is intended to refer to any form of presentation that is of benefit to the owner of private data store 104. This can take forms other than a conventional advertisement with an explicit presentation that is separate from the presentation of the image. For instance, in the example described below with reference to the Petfinder® database, the presentation of an animal image itself may serve as an ad, insofar as presenting images of adoptable animals to the public serves Petfinder's® interest, namely increasing the public interest in adopting animals. Additionally, presenting the images as part of a HIP challenge requires the individual taking the HIP challenge to spend some time looking at the images, thereby increasing the likelihood that the benefit to the owner of the private data store is achieved. In typical presentation of "ads" there is a low response rate because there is no requirement that individuals view the ads. Presenting "ads" during a HIP challenge overcomes this obstacle. In this manner, presentation of the images provides at least two concurrent benefits, such as, for example, the "ad" and a more secure HIP challenge.

In the described embodiment, HIP component 102 has access to a large number of manually categorized private images thereby making it difficult for a party that is attempting to circumvent the HIP challenge from recreating a sufficient portion of the database of images. The discussion that follows employs an example of a free internet e-mail service as computer application 106 for illustrative purposes. Computer application 106 is not limited to a free e-mail service. Computer application 106 can be any internet, intranet, or non-networked program that benefits from distinguishing between a human an non-human user.

Private data store 104, in one example, contains a large number of images that have been manually categorized by one or more humans. In one aspect, the quantity of manually categorized images in the data store can optionally be required to exceed a pre-defined threshold. The pre-defined threshold can be, but is not limited to being, based upon a database reconstruction economic determination. The database reconstruction economic determination can, in one example, be the cost to reconstruct all or part of the data store in order for a computer program to pass the HIP a specified percentage of attempts being less than the cost to employ one or more humans to pass the HIP a number of attempts. Another way that this can be stated is having a quantity of manually categorized images such that the most cost effective way to pass the HIP is to employ humans to perform the challenge. The majority of private data store 104 is not directly publicly accessible. In a preferred embodiment, private data store 104 is accessible to HIP component 102 through a networked connection via a private secured application program interface (API). Alternatively, private data store 104 can be installed locally to HIP component 102. However, having private data store 104 copied to more than one location increases the probability that it may get into the wrong hands, for example, an e-mail spammer. Private data store 104 can be dynamic such that new manually categorized images are added on a regular basis.

Figure 3:
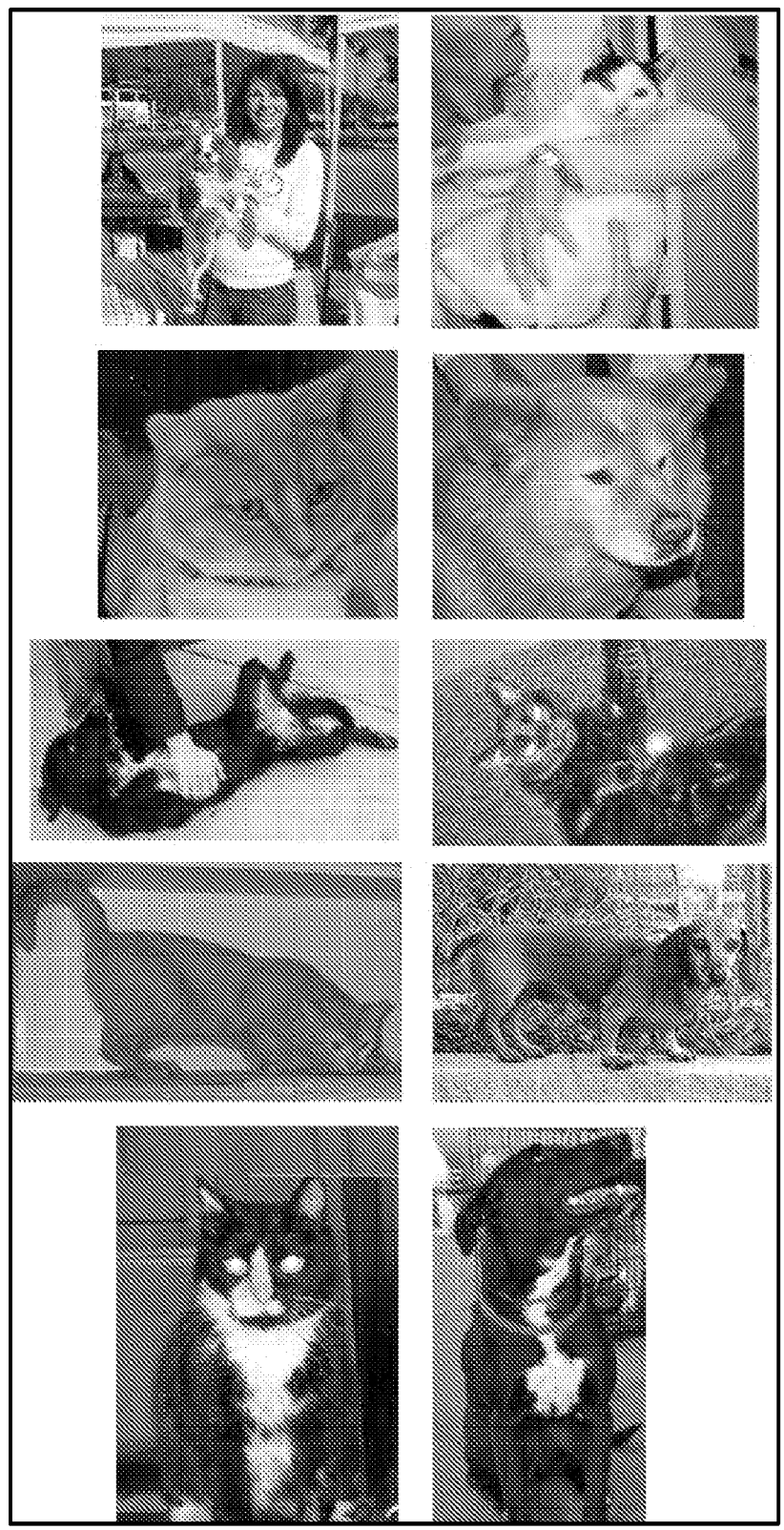
FIG. 3 shows some examples of side by side images of cats and dogs that demonstrate similarities that can cause problems for a machine vision system trying to classify the image as a cat or a dog.

An example private data store 104 is that owned by Petfinder®. Petfinder® has a web site devoted to finding homes for homeless animals. Petfinder® has a database of over 3 million cat and dog images, each of which is categorized with very high accuracy by human volunteers working in thousands of animal shelters throughout the United States and Canada. Petfinder's® database grows by nearly 10,000 images daily. Humans can readily distinguish a cat from a dog. However, computer algorithms have a much more difficult time distinguishing cats from dogs. Photos have a wide variety of backgrounds, angles, poses, lighting; factors that make accurate automatic classification difficult. FIG. 3 shows some example of side by side images of cats and dogs that demonstrate similarities that can cause problems for a machine vision system trying to tell the difference between a cat and a dog. Additionally, through the Petfinder.com® web site, only pets that are currently available for adoption are presented, which is less than 10 percent of the total images. Therefore, the majority of the database is not publicly accessible and is not likely to be reconstructed by an outside party, such as an e-mail spammer. The database is sufficiently large such that it would not be economical to attempt to reconstruct the database. For example, if the HIP challenge presented 12 images from the database which user 108 would need to categorize as cat or dog, a spammer would need to solve about 600,000 12-image challenges to reveal 95% of the database. Petfinder® has an incentive to display their adoptable pets to as wide an audience as possible in order to increase their chances of adoption. The owner of the HIP component 102 has an incentive to provide ads for Petfinder® so that they can access the large database of manually categorized images. Another example of a private data store 104 is the database of children maintained by the National Center for Missing & Exploited Children® (NCMEC). The NCMEC also has an incentive to display the children that are missing or exploited to a wide audience in order to get information as to their whereabouts or condition. Humans can easily distinguish a male from a female child, while a non-human system would have much more difficulty identifying the gender of a child.

Figure 4:
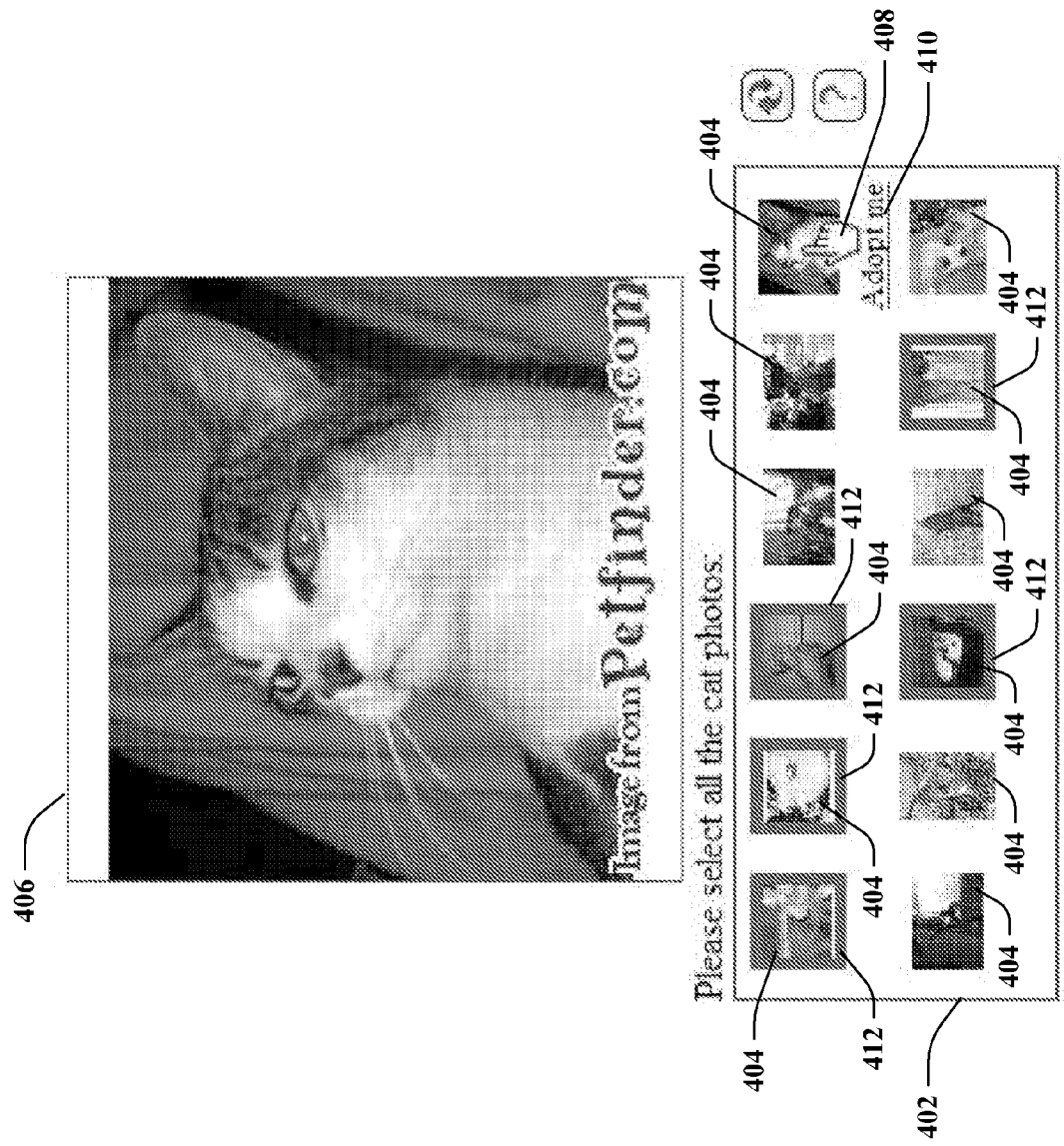
FIG. 4 illustrates an example of HIP challenge displayed to a user consisting of twelve images from the Petfinder® database.

HIP component 102 is called by computer application 106 in order to verify that user 108 is a human. HIP component 102 can be local or remote from computer application 106. However, installing HIP component 102 locally to each of a plurality of computer applications 106 increases the security risk of private data store 104 being compromised by a spammer because each installation of HIP component 102 would have API access to private data store 104. Therefore, it is preferred to install HIP component 102 remotely from computer application 106. For example, HIP component 102 can be a web service that is employable by a plurality of remote web based computer applications 106, such as by calling an API. User 108 can be local or remote to computer application 106. User 108 interacts with computer application 106 in order to gain access to one or more feature of computer application 106. Computer application 106 can at anytime invoke HIP component 102 to determine if user 108 is a human. In the example of a free internet e-mail service, user 108 may want to establish an e-mail account. Computer application 106 can invoke HIP component 102 before and/or after gathering account information from user 108. HIP component 102 will display a challenge to determine if user 108 is human. The challenge consists of displaying one or more images from private data store 104 that user 108 must classify. Each image can belong to one of a plurality of classes for which user 108 must classify the image. Any appropriate means to indicating the categorization of an image by user 108 can be employed, such as check boxes, highlighting, borders, fading, etc. HIP component 102 also displays one or more ads on behalf of the owner of private data store 104 along with the one or more images. Ads can be text or images. For example as depicted in FIG. 4, the challenge can consist of twelve images from the Petfinder® database that user 108 must categorize each as cat or dog. When user 108 places cursor 408 over a pet image 404 in lower box 402, upper box 406 displays a larger image of pet image 404 that the cursor is hovering over. When user 108 selects a pet image 404 a border 412 is placed around the selected pet image 404 to indicate that user 108 has identified this image as a cat. In FIG. 4 for example, five pet images 404 have been selected as cats. For images that represent a pet that is available for adoption, an ad 410 can be presented with the image indicating that the pet is available for adoption. The ad 410 can be a text or graphical hyperlink, such as to additional information about the adoptable pet at Petfinder.com®. In some circumstances, the image itself may serve as an ad, in particular when the presentation of the image is of benefit to the interests of the owner of private data store 104. For example, presenting images of adoptable animals to the public serves Petfinder's® interest, namely increasing the public interest in adopting animals. The additional information may provide the category information for the pet. Therefore, in one aspect, the link can optionally be secured such that the challenge is invalidated when the link is selected to prevent a computer program from using the link to identify if the pet is a cat or dog. In another aspect, the IP address of the user 108 can be tracked and the number of times an ad can be selected can be optionally limited to a predetermined threshold, such as a specified number of times per day. This prevents a computer program from employing the ad as a link to private data store 104 in order to reconstruct all or a portion of private data store 104.

In another aspect, HIP component 102 can optionally employ attributes associated with user 108 or inferences based upon the attributes in order to select one or more images from private data store 104 to display as part of the challenge. For example, an IP address associated with user 108 can provide geographic information indicative of the location of user 108. HIP 102 can then select one or more images of pets that are located within close geographic proximity to user 108. In another example, information gathered by computer application 106 from user 108 can be transmitted to HIP component 102. HIP component can employ this information or inferences based upon the information to select one or more images from private data store 104. For example, user 108 may provide their age or gender when providing information to computer application 106. HIP component 102 can employ the age or gender to select images of pet breeds that are age appropriate or more prone to be adopted by a particular gender. For example, a cocker spaniel may be more appropriate for a child than a pit bull. This also provides a more user targeted ad, which increases the probability that the user will respond to the ad.

In yet another aspect, HIP component 102 can optionally employ statistics to prune the selectable images from private data store 104. For example, HIP component 102 can track images that a user 108 incorrectly categorizes and after determining that user 108 is a human, tag those images, such as by a count, as being potentially difficult for a human to correctly categorize. User 108 can be determined to be human, for example, based upon passing a subsequent challenge. The statistics can be tracked over large population of users 108 and images that exceed a threshold can be prevented from being employed by HIP component 102 as part of challenges. The threshold can be, for example, a predetermined count and/or percentage of incorrect attempts versus correct attempts by a human.

After user 108 has made their category selections for the images, user 108 submits the selections to HIP component 102, for example, by selecting a submit button on the display. HIP component 102 then determines if user 108 has correctly categorized the images and makes a determination as to whether user 108 is human or non-human. HIP component 102 then notifies computer application 106 of the determination. The determination can be a binary determination or a percentage indication of the likelihood that the user is a human. For example, a percentage determination can be based upon a statistical difficulty associated with an image that is based upon counts of users determined to be human that incorrectly categorized the image. Computer application 106 can then employ the determination in assessing whether access should be provided to user 108. For example, if the determination is that user 108 is human then access to features of computer application can be granted to user 108. If the determination is that user 108 is non-human access can be denied by computer application 106. If the determination is in the form of percentage likelihood that user 108 is human, computer application 106 can employs the percentage with an algorithm based on the level of security desired to grant or restrict access. For example, if computer application is willing to trade-off a little security in order to let more potentially real humans gain access, then the algorithm may grant access as long as the percentage is above predetermined threshold.

Figure 5:
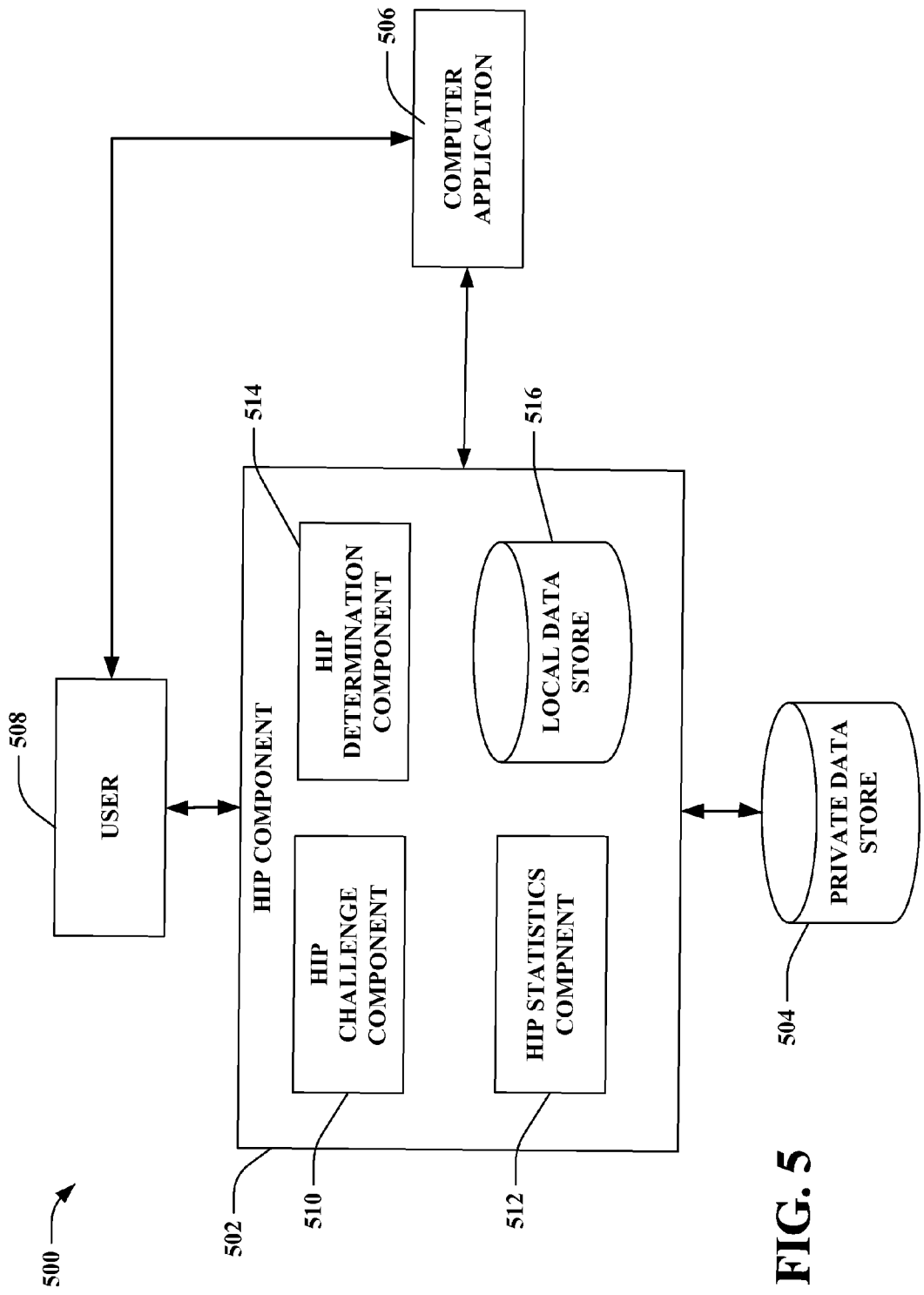
FIG. 5 illustrates a general block diagram HIP system employing a large private data store of substantially accurately manually categorized images.

Referring to FIG. 5, there is illustrated a general block diagram HIP system 500 employing a large private data store of substantially accurately manually categorized images. System 500 includes a Human Interactive Proof (HIP) component 502 that distinguishes between a human and a non-human. HIP component 502 presents one or more challenges to user 508 to determine if user 508 is a human or a computer program. The challenges can include presenting one or more images to user 508 from private data store 504 that user 508 must correctly categorize before being allowed to partially or fully employ computer application 506. HIP component 502 and/or computer application 506 is owned by a party that is not the owner of the private data store 504.

Private data store 504 contains a large number of images that have been manually categorized by one or more humans. In one aspect, the quantity of manually categorized images in the data store can be required to exceed a pre-defined threshold. Private data store 504 is not directly publicly accessible. The majority of private data store 504 is accessible to HIP component 502 through a networked connection via a private secured application program interface (API). Optionally, HIP component 502 can include a local data store 516 which contains a copy of all or part of the data from private data store 504. Private data store 504 can be dynamic such that new manually categorized images are added on a regular basis. Similarly, local data store 516 can be dynamic such that new categorized images are copied from private data store 504 on a regular basis. Local data store 516 can also be dynamic such that the images therein are modified slightly by an automated process; this makes it more difficult for an attacker to recognize the same image on multiple occasions, thereby defeating some simple attacks on the HIP system.

HIP component 502 is called by computer application 506 in order to verify that user 508 is a human. HIP component 502 can be local or remote from computer application 506. User 508 interacts with computer application 506 in order to gain access to one or more feature of computer application 506. Computer application 506 can at anytime invoke HIP component 502 to determine if user 508 is a human. HIP challenge component 510 will display a challenge to user 508 determine if user 508 is human. The challenge consists of displaying one or more images from private data store 504 that user 508 must classify. HIP challenge component 510 may modify the images slightly before presenting them to the user; this makes it more difficult for an attacker to recognize the same image on multiple occasions, thereby defeating some simple attacks on the HIP system. Each image can belong to one of two or more classes. Any appropriate means to indicating the categorization of an image by user 508 can be employed, such as check boxes, highlighting, borders, fading, etc. HIP challenge component 510 also displays one or more ads on behalf of the owner of private data store 504 along with the one or more images. Ads can be text or images and can include a hyperlink. Hyperlinks are preferably secured such that the challenge is invalidated when the link is selected to prevent a computer program from using the link to identify category information associated with an image. In another aspect, the IP address of the user 508 can be tracked and the number of times an ad can be selected can be optionally limited to a predetermined threshold, such as a specified number of times per day. This prevents a computer program from employing the ad as a link to private data store 504 in order to reconstruct all or a portion of private data store 504. In another aspect, HIP challenge component 510 can optionally employ attributes associated with user 508 in order to select one or more images from private data store 504 to display as part of the challenge.

In yet another aspect, HIP statistics component 512 can optionally employ statistics to prune the selectable images from private data store 504. For example, HIP statistics component 512 can track images that a user 508 incorrectly categorizes and after determining that user 508 is a human, tag those images, such as by a count, as being potentially difficult for a human to correctly categorize. The statistics can be tracked over large population of users 508 and images that exceed a threshold can be prevented from being employed by HIP challenge component 510 as part of challenges. The threshold can be, for example, a predetermined count and/or percentage of incorrect attempts versus correct attempts by a human.

After user 508 has made their category selections for the images, user 508 submits the selections to HIP component 502, for example, by selecting a submit button on the display. HIP determination component 514 then determines if user 508 has correctly categorized the images and makes a determination as to whether user 508 is human or non-human. HIP determination component 514 then notifies computer application 506 of the determination. The determination can be a binary determination or a percentage indication of the likelihood that the user is a human. For example, a percentage determination can be based upon a statistical difficulty assigned to an image by HIP statistics component 512 that is based upon counts of users determined to be human that incorrectly categorized the image. Computer application 506 can then employ the determination in assessing whether access should be provided to user 508.

Figure 6:
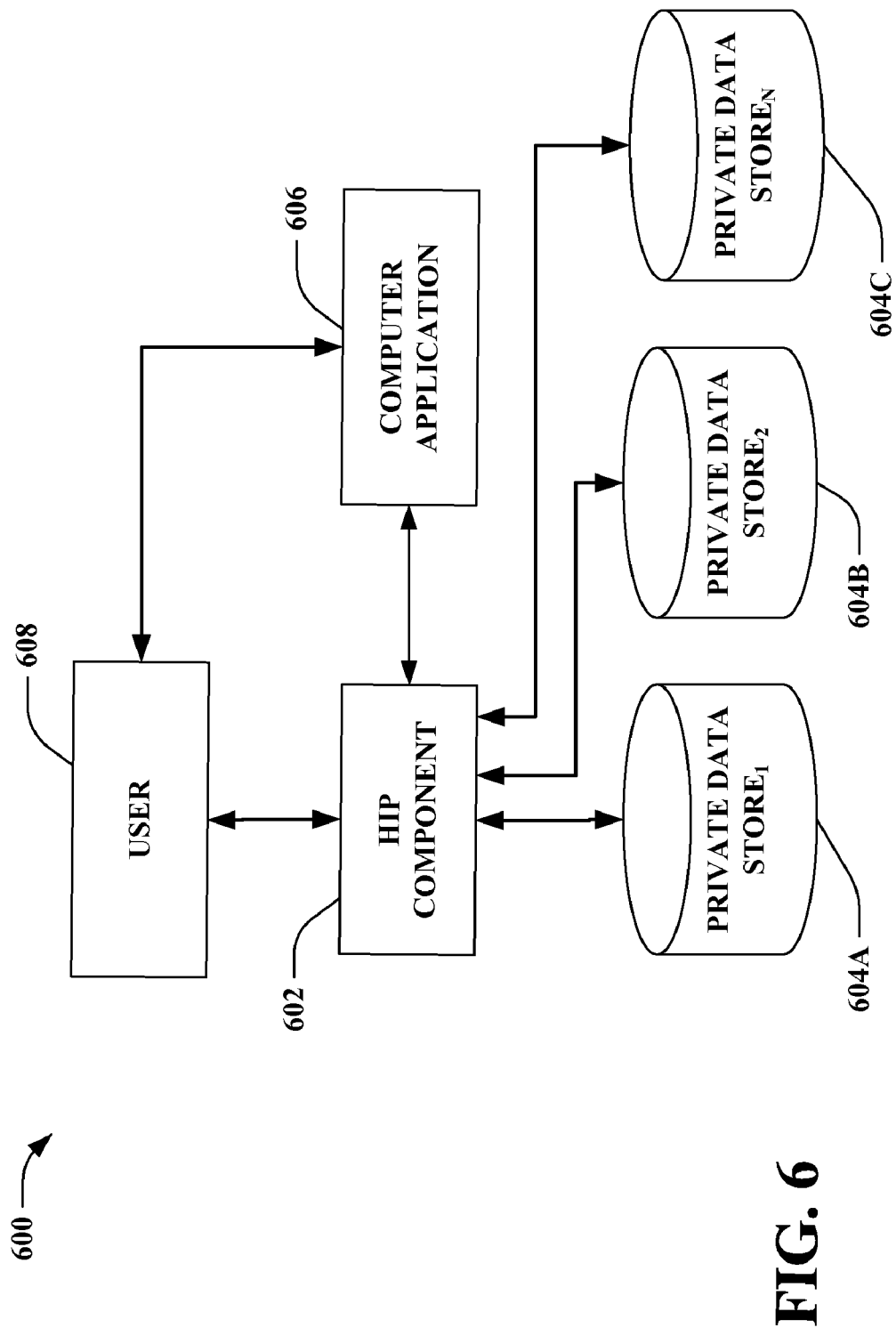
FIG. 6 illustrates a general block diagram HIP system employing a plurality of large private data stores of substantially accurately manually categorized images.

Referring to FIG. 6, there is illustrated a general block diagram HIP system 600 employing a plurality of large private data stores of substantially accurately manually categorized images. System 600 includes a Human Interactive Proof (HIP) component 602 that distinguishes between a human and a non-human. HIP component 602 presents one or more challenges to user 608 to determine if user 608 is a human or a computer program. The challenges can include presenting one or more images to user 608 from one or more of private data stores 604A, 604B or 604C that user 608 must correctly categorize before being allowed to partially or fully employ computer application 606. HIP component 602 and/or computer application 606 is owned by a party that is not the owner(s) of the private data stores 604A, 604B or 604C.

Private data stores 604A, 604B or 604C each contain a large number of images that have been manually categorized by one or more humans into two or more classes. Although FIG. 6 shows three private data stores$_{1...N}$, where N is an integer, any number of private data stores can be employed. Each private data store 604A, 604B or 604C can contain different types of images. For example. Private data store$_1$ 604A can be the Petfinder database and private database$_2$ 604B can be the National Center for Missing & Exploited Children® (NCMEC) database. The majority of private data stores 604A, 604B or 604C are not directly publicly accessible. Private data stores 604A, 604B or 604C are accessible to HIP component 602 through a networked connection via a private secured application program interface (API). Alternatively, one or more of private data stores 604A, 604B or 604C can be installed locally to HIP component 602. Private data s 604A, 604B or 604C can be dynamic such that new manually categorized images are added on a regular basis.

HIP component 602 is called by computer application 606 in order to verify that user 608 is a human. HIP component 602 can be local or remote from computer application 606. User 608 interacts with computer application 606 in order to gain access to one or more feature of computer application 606. Computer application 606 can at anytime invoke HIP component 602 to determine if user 608 is a human. HIP component 602 will display a challenge to user 608 determine if user 608 is human. The challenge consists of displaying one or more images from one or more of private data stores 604A, 604B or 604C that user 608 must classify. The images may be modified slightly before presenting them to the user; this makes it more difficult for an attacker to recognize the same image on multiple occasions, thereby defeating some simple attacks on the HIP system. Any appropriate means to indicating the categorization of an image by user 608 can be employed, such as check boxes, highlighting, borders, fading, etc. HIP component 602 also displays one or more ads on behalf of the owner(s) of private data stores 604A, 604B or 604C along with the one or more images. Ads can be text or images and can include a hyperlink. Hyperlinks are preferably secured such that the challenge is invalidated when the link is selected to prevent a computer program from using the link to identify category information associated with an image. In another aspect, the IP address of the user 608 can be tracked and the number of times an ad can be selected can be optionally limited to a predetermined threshold, such as a specified number of times per day. This prevents a computer program from employing the ad as a link to private data stores 604A, 604B or 604C in order to reconstruct all or a portion of private data stores 604A, 604B or 604C. In another aspect, HIP component 602 can optionally employ user 608 entered or inferred attributes associated with user 608 in order to select a private data store 604A, 604B or 604C from which to employ one or more images to display as part of the challenge. For example, if attributes of user 608 indicate that the user is a child then displaying missing children would be inappropriate and so images of pets from private data store 604A can be displayed as part of he challenge. If for example, attributes of user 608 indicate that the user 608 is a mother, then images of missing kids from private data store 604B can be displayed as part of the challenge.

After user 608 has made their category selections for the images, user 608 submits the selections to HIP component 602, for example, by selecting a submit button on the display. HIP component 602 then determines if user 608 has correctly categorized the images and makes a determination as to whether user 608 is human or non-human. HIP component 602 notifies computer application 606 of the determination.

The determination can be a binary determination or a percentage indication of the likelihood that the user is a human. For example, a percentage determination can be based upon a statistical difficulty assigned to an image that is based upon counts of users determined to be human that incorrectly categorized the image. Computer application 606 can then employ the determination in assessing whether access should be provided to user 608.

In view of the exemplary systems shown and described supra, methodologies that may be implemented in accordance with the disclosed subject matter will be better appreciated with reference to the flow charts described below. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

Figure 7:
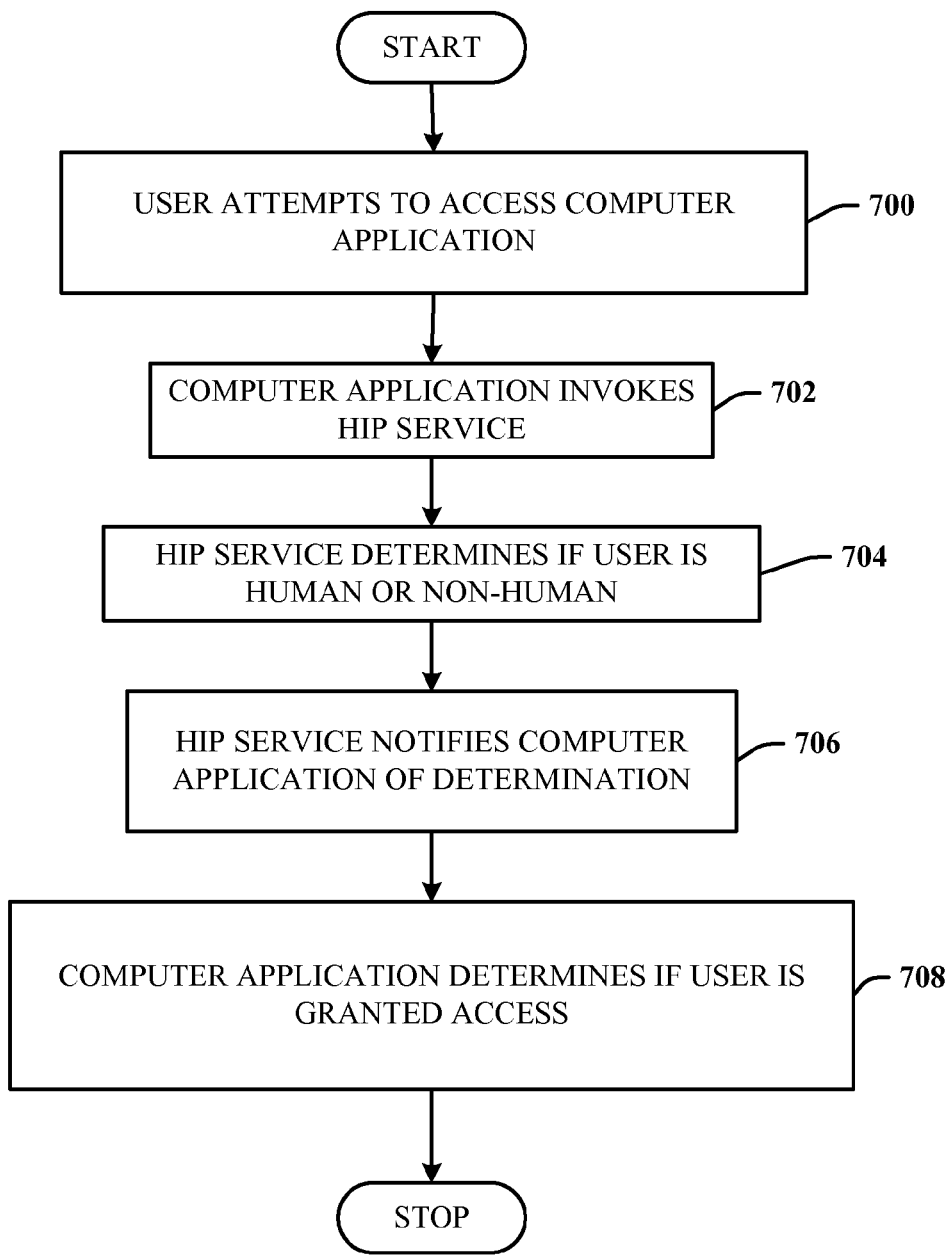
FIG. 7 illustrates a flow chart of one methodology for employing a HIP service and one or more large private databases of manually categorized images to distinguish between a human and non-human user taking a HIP challenge.

Referring now to FIG. 7 there is illustrated a flow chart of one methodology for a computer application to employ a HIP service that uses a large private database of manually categorized images to distinguish between a human and non-human user taking a HIP challenge. At 700 a user attempts to access a computer application. At 702 the computer application invokes a HIP service. At 704, the HIP service determines if the user is a human or non-human. At 706, the HIP service notifies the computer application of the determination. At 708, the computer application employs the determination from the HIP service to decide if the user will be granted access to features of the computer application.

Figure 8:
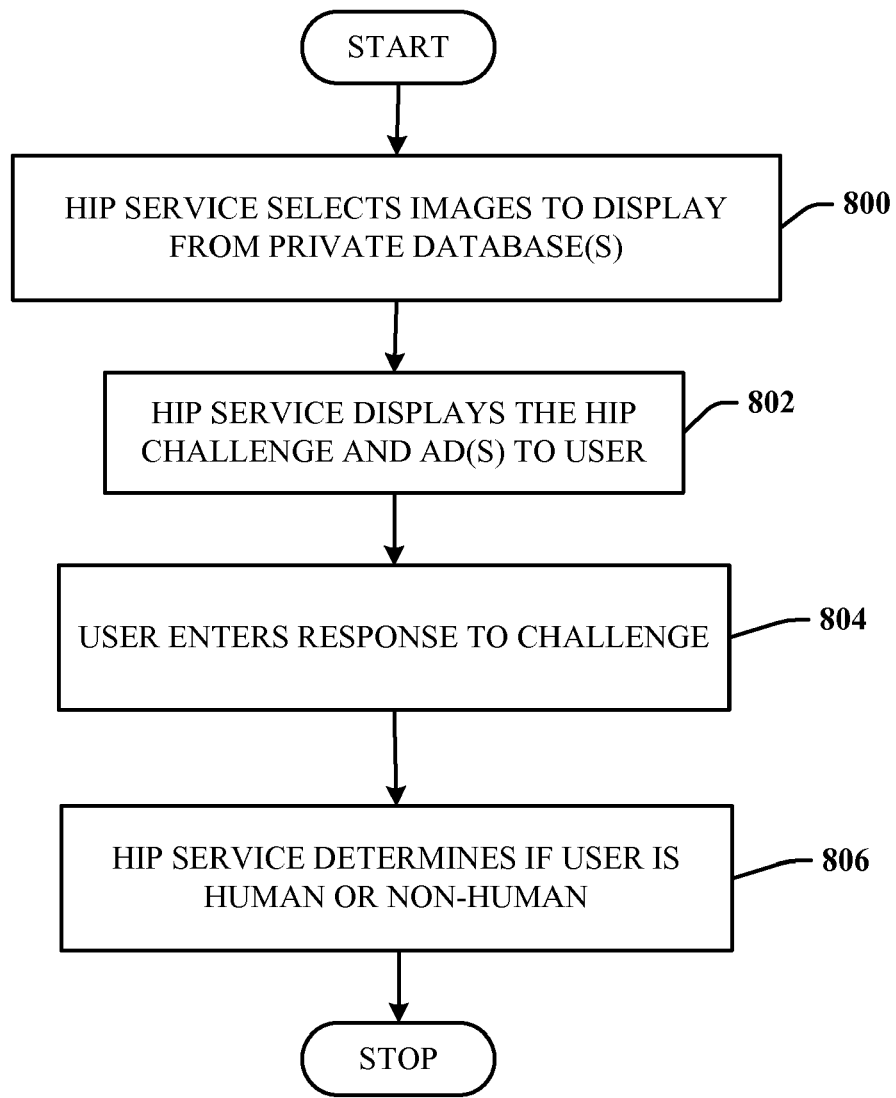
FIG. 8 illustrates a flow chart of one methodology for a HIP service to employ one or more large private databases of manually categorized images to distinguish between a human and non-human user taking the HIP challenge.

Referring to FIG. 8 there is illustrated a flow chart of one methodology for a HIP service to employ one or more large private databases of manually categorized images to distinguish between a human and non-human user taking the HIP challenge. At 800 HIP service selects one or more images from one or more private databases to display as part of the HIP challenge. The selection of database and/or image can be based upon user supplied or inferred attributes of the user. The HIP service may have a different owner than the private databases. However, there is an alignment of interests between the owner(s) of the one or more private databases and an owner of the HIP service. The owner(s) of the one or more private databases makes the databases available for use by the HIP service in exchange for display of one or more ads on behalf of the owner(s) of the private databases during HIP challenges. In this manner, the HIP service has access to a large number of manually categorized private images making it difficult for a party that is attempting to circumvent the HIP challenge from recreating a sufficient portion of the database of images. The private databases contain a large number of images that have been manually categorized by one or more humans into a plurality of classes. In one aspect, the quantity of manually categorized images in the data store can optionally be required to exceed a pre-defined threshold. The pre-defined threshold can be, but is not limited to being, based upon a database reconstruction economic determination.

At 802 HIP service displays to a user the selected HIP challenge images along with one or more ads on behalf of the owner(s) of the private databases. The user is required to correctly classify the images. At 804, the user enters their classification for each image to the HIP service. At 806, the HIP service makes a determination as to the user being human or non-human. The determination can be a binary determination or a percentage indication of the likelihood that the user is a human.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 9:
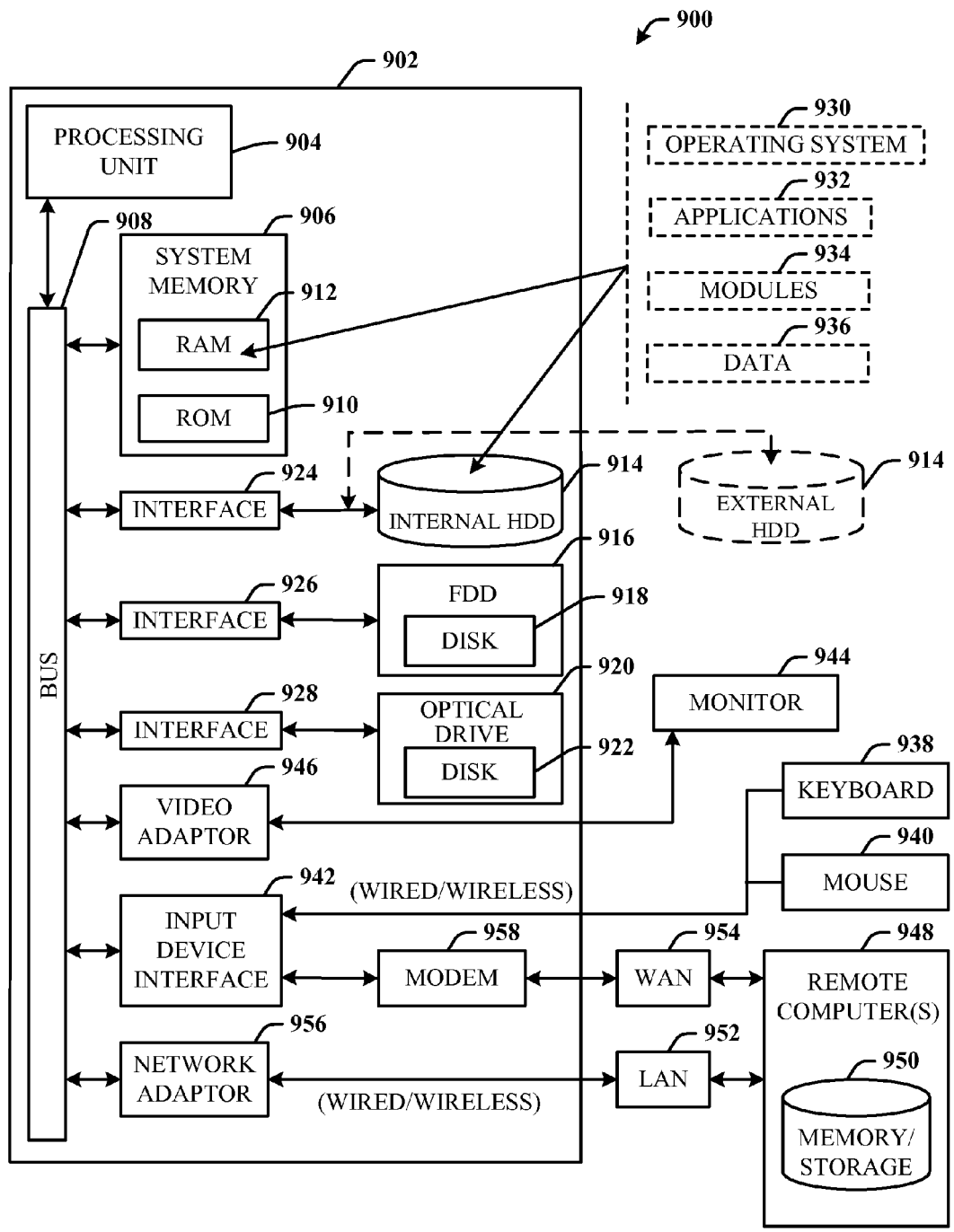
FIG. 9 illustrates a block diagram of a computer operable to execute the disclosed HIP service.

Referring now to FIG. 9, there is illustrated a block diagram of a computer operable to execute the disclosed system. In order to provide additional context for various aspects thereof, FIG. 9 and the following discussion are intended to provide a brief, general description of a suitable computing environment 900 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the claimed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 10:
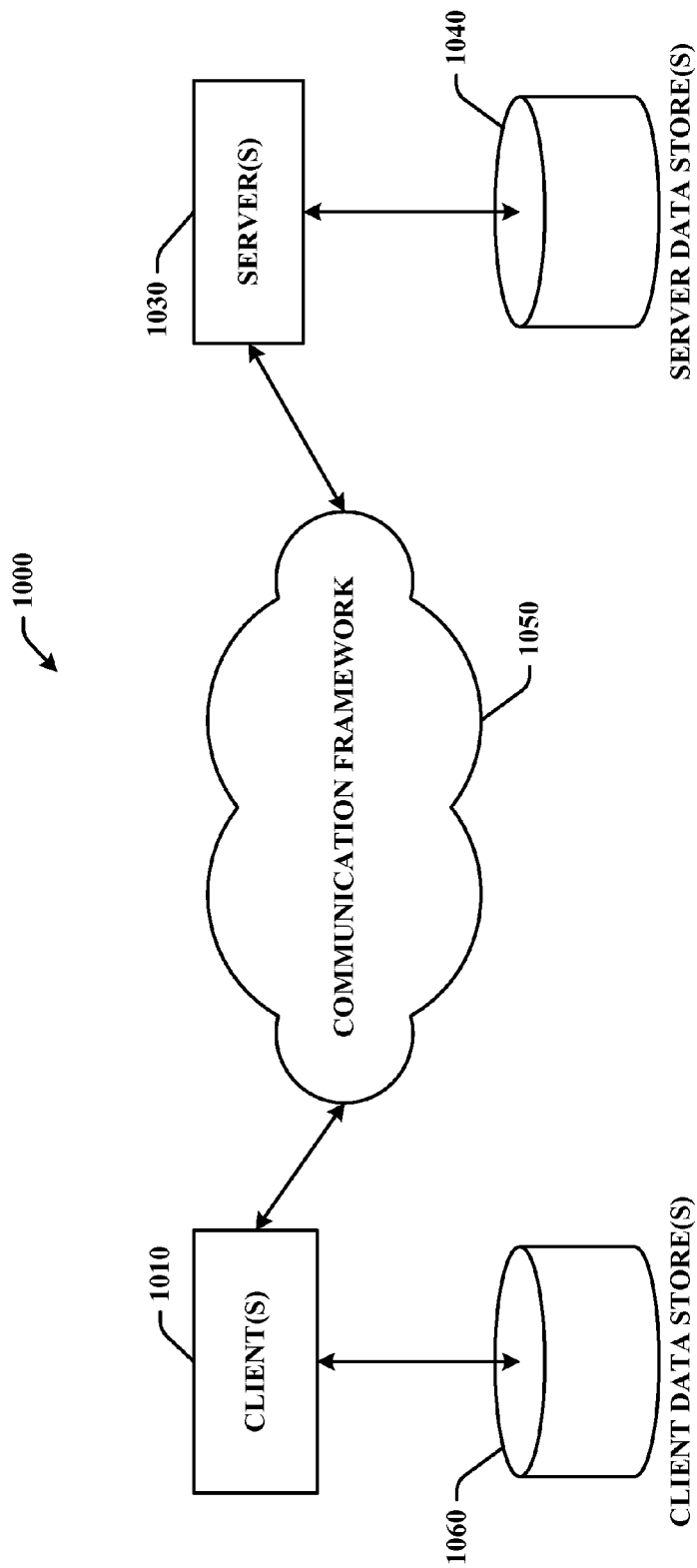
FIG. 10 illustrates a schematic block diagram of an exemplary computing environment for implementing a HIP service in accordance with another aspect.

Referring now to FIG. 10, there is illustrated a schematic block diagram of an exemplary computing environment 1000 for processing the inference-based query completion architecture in accordance with another aspect. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a private data store of images previously categorized based on recognition by a human; and
    at least one processor and at least one computer-readable storage medium storing instructions executable by the at least one processor to implement
        a human interactive proof (HIP) component configured to display one or more images from the private data store as part of an HIP challenge, wherein
        the private data store is available to the HIP component on the basis of an arrangement to display at least one advertisement associated with the private data store,
        the HIP component is configured to display the at least one advertisement in conjunction with the HIP challenge, and
        the HIP component is configured to make a determination regarding whether a response to the HIP challenge indicates a human responder or not, based on receiving a classification of the one or more images in response to the HIP challenge.

2. The system of claim 1, wherein the advertisement is for an offering represented by at least one image of the private data store.

3. The system of claim 1, wherein the private data store is only accessible through a private secured application program interface (API).

4. The system of claim 1, wherein the private data store contains a quantity of the previously categorized images in the data store that exceeds a pre-defined threshold.

5. The system of claim 4, wherein the pre-defined threshold is a quantity of the previously categorized images determined in consideration of a cost of responding to the HIP challenge.

6. The system of claim 1, wherein the private data store is dynamically updated with additional previously categorized images periodically.

7. The system of claim 1, wherein the HIP component employs attributes associated with an entity subject to the HIP challenge in order to select one or more images from the private data store to display as part of the HIP challenge.

8. The system of claim 4, wherein the pre-defined threshold is determined at least partly based on a database reconstruction economic determination that determines whether a cost to reconstruct all or part of the data store in order for a computer program to pass the HIP challenge in a specified percentage of attempts is less than a cost to employ one or more humans to pass the HIP challenge in a number of attempts.

9. The system of claim 1, wherein the HIP component is configured to employ statistics to prevent images from the private data store that are statistically determined to be difficult for a human to classify from being displayed as part of the HIP challenge.

10. The system of claim 1, wherein the determination is a binary determination or a percentage indication of a likelihood.

11. The system of claim 1, wherein an ownership of the private data store is different from an ownership of the HIP component.

12. A method, comprising:
accessing, by an HIP component, a private data store of images previously categorized based on human recognition, based on an arrangement to display at least one advertisement associated with the private data store;
displaying, on a display device, one or more images from the private data store as part of a HIP challenge;
displaying at least one advertisement associated with the private data store in conjunction with the HIP challenge; and
determining a characteristic of a responder to the HIP challenge based upon receiving a response to the HIP challenge classifying the one or more images.

13. The method of claim 12, the accessing including accessing images from the private data store through a private secured application program interface (API).

14. The method of claim 12, further comprising maintaining a quantity of the previously categorized images in the private data store that exceeds a pre-defined threshold.

15. The method of claim 12, further comprising indicating the classifying with at least one of a check box, highlighting, a border or fading.

16. The method of claim 12, further comprising dynamically updating the private data store with additional previously categorized images periodically.

17. The method of claim 12, further comprising employing attributes associated with of an entity subject to the HIP challenge in order to select one or more images from the private data store to display as part of the challenge.

18. The method of claim 1, further comprising displaying the HIP challenge to restrict access to one or more features of a web service.

19. A computer-readable storage device for storing instruction that, if executed by a computer device, case the computing device to perform operations comprising:
displaying one or more images from one or more private data stores of images previously categorized by one or more humans, as part of an HIP challenge on the basis of an arrangement that makes the one or more private data stores available to the HIP challenge in exchange for displaying one or more advertisements associated with the one or more private data stores;
displaying at least one advertisement in conjunction with the HIP challenge; and
determining a characteristic of a responder to the HIP challenge based upon a classification of the one or more images.

20. The computer-readable medium storage device of claim 19, the operations further comprising displaying the one or more image based upon attributes of an entity subject to the HIP challenge in order to select at least one of the one or more private data stores from which to display the one or more images as part of the HIP challenge.

* * * * *